United States Patent
Kempkes et al.

(10) Patent No.: US 8,280,793 B1
(45) Date of Patent: Oct. 2, 2012

(54) PREPAID CALLING CARD ACCOUNTS LINKED TO CREDIT CARD ACCOUNTS, WITH METHODS FOR CREATING AND MANAGING THE SAME

(75) Inventors: Rodney J. Kempkes, Omaha, NE (US); Mark J. Pettay, Omaha, NE (US); Robert E. Johnson, Omaha, NE (US); David C. Mussman, Lincoln, NE (US)

(73) Assignee: West Corporation, Omaha, NE (US)

( * ) Notice: Subject to any disclaimer, the term of this patent is extended or adjusted under 35 U.S.C. 154(b) by 1928 days.

(21) Appl. No.: 10/196,326

(22) Filed: Jul. 16, 2002

Related U.S. Application Data

(60) Provisional application No. 60/305,830, filed on Jul. 16, 2001.

(51) Int. Cl.
*G06Q 40/00* (2012.01)
(52) U.S. Cl. ............... 705/35; 705/30; 705/34; 705/39; 705/40; 379/114.15; 379/114.19; 379/114.2
(58) Field of Classification Search ............ 705/39
See application file for complete search history.

(56) References Cited

U.S. PATENT DOCUMENTS

| | | | |
|---|---|---|---|
| 5,226,073 A | 7/1993 | Albal et al. | |
| 5,487,107 A | 1/1996 | Atkins | |
| 553,023 A | 6/1996 | Taylor | |
| 5,578,808 A | 11/1996 | Taylor | |
| 562,178 A | 4/1997 | McKoy et al. | |
| 572,969 A | 5/1998 | Holda-Fleck | |
| 5,825,863 A * | 10/1998 | Walker | 379/114.2 |
| 5,850,599 A | 12/1998 | Seiderman | |
| 5,864,830 A | 1/1999 | Armetta | |
| 5,884,271 A | 3/1999 | Pitroda | |
| 590,948 A | 6/1999 | Walker et al. | |
| 591,500 A | 6/1999 | Klapka | |
| 592,373 A | 7/1999 | Taskett | |
| 5,991,748 A * | 11/1999 | Taskett | 705/41 |

(Continued)

FOREIGN PATENT DOCUMENTS

WO    WO 99/49404    *    9/1999

OTHER PUBLICATIONS

Mulkins, Phil, "Protect 'Credit Identity' PIN from Phone Sharks," Mar. 26, 1997, Tulsa World, p. A.2.*

Lansner, Jonathan, "Making a Statement. Banks Hope to Lure Customers by Providing Complete Account of Transactions." Jun. 11, 1990, The Orange County Register, p. E01.*

(Continued)

*Primary Examiner* — Elizabeth Rosen

(57) ABSTRACT

Methods, apparatus, and computer readable media for linking a prepaid calling card account to a credit card account. The linkage can occur at the time of a transaction involving the credit card account, or when the credit card account is acquired, activated, or renewed. The method can include at least the following. At least one transaction can be executed using the credit card account as payment for the transaction, or the credit card account can be acquired, activated or renewed. A prepaid calling card account is associated with the credit card account, and information related to the new prepaid calling card account is provided to a holder of the credit card account. Various aspects of the invention also provide anti-fraud and credit card recovery capability based on the above teaching.

15 Claims, 1 Drawing Sheet

U.S. PATENT DOCUMENTS

| | | | |
|---|---|---|---|
| 6,115,458 A * | 9/2000 | Taskett | 379/114.2 |
| 6,137,872 A * | 10/2000 | Davitt et al. | 379/114.2 |
| 6,193,154 B1 | 2/2001 | Phillips | |
| 6,195,419 B1 | 2/2001 | Gilboy | |
| 6,227,447 B1 | 5/2001 | Campisano | |
| 6,343,279 B1 * | 1/2002 | Bissonette et al. | 705/41 |
| 6,374,301 B1 * | 4/2002 | Melen | 709/232 |
| 6,404,866 B1 * | 6/2002 | Hopper et al. | 379/114.15 |
| 6,628,766 B1 * | 9/2003 | Hollis et al. | 379/114.2 |
| 2002/0066110 A1 * | 5/2002 | Cloonan et al. | 725/111 |
| 2002/0091632 A1 | 7/2002 | Turock et al. | |
| 2005/0246252 A1 * | 11/2005 | Wallace et al. | 705/30 |

OTHER PUBLICATIONS

Bertrand, Kate. "Citibank Tests AT&T Loyalty Program for Cobranded Card," Card Marketing, (Dec. 1999), v. 3, n. 11, p. 9.*

Osborn, Claire, "Post Office Starts Selling Telephone Cards," Nov. 15, 1995, Austin American Statesman, p. D.1.*

Dunn, Terri and Darr, James J. "US Sprint, State Street Bank Offer One-Stop Calling-Card, Visa Card Service," Business Wire (Nov. 10, 1989), Sec. 1, p. 1.*

\* cited by examiner

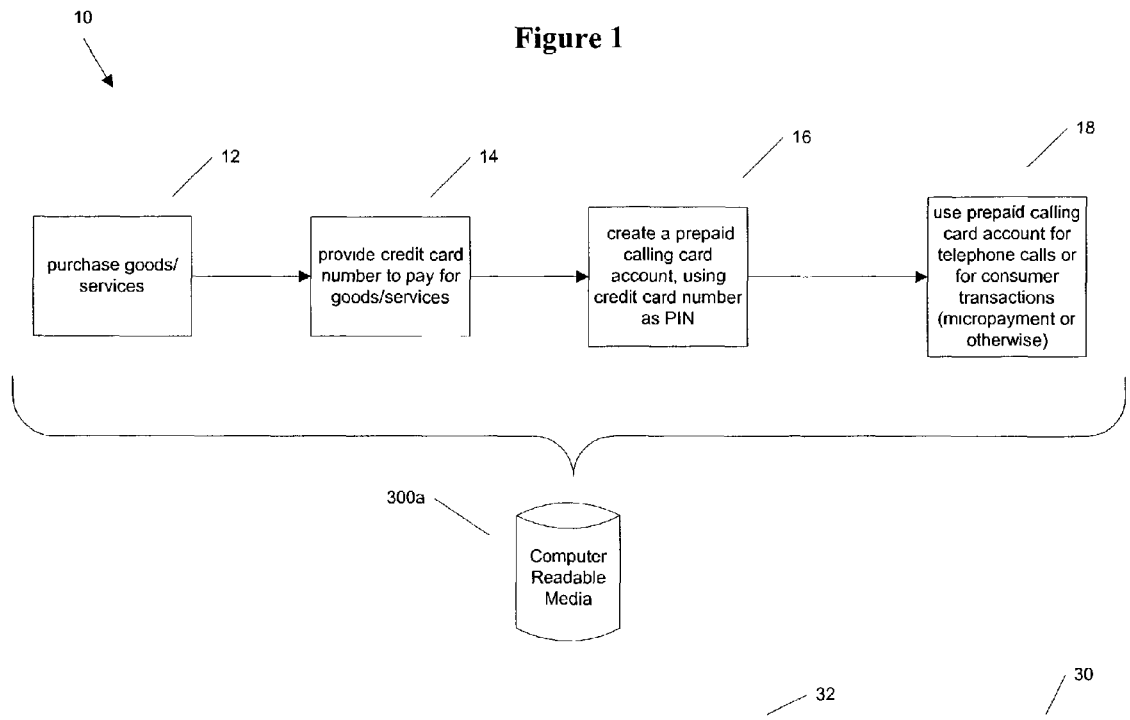
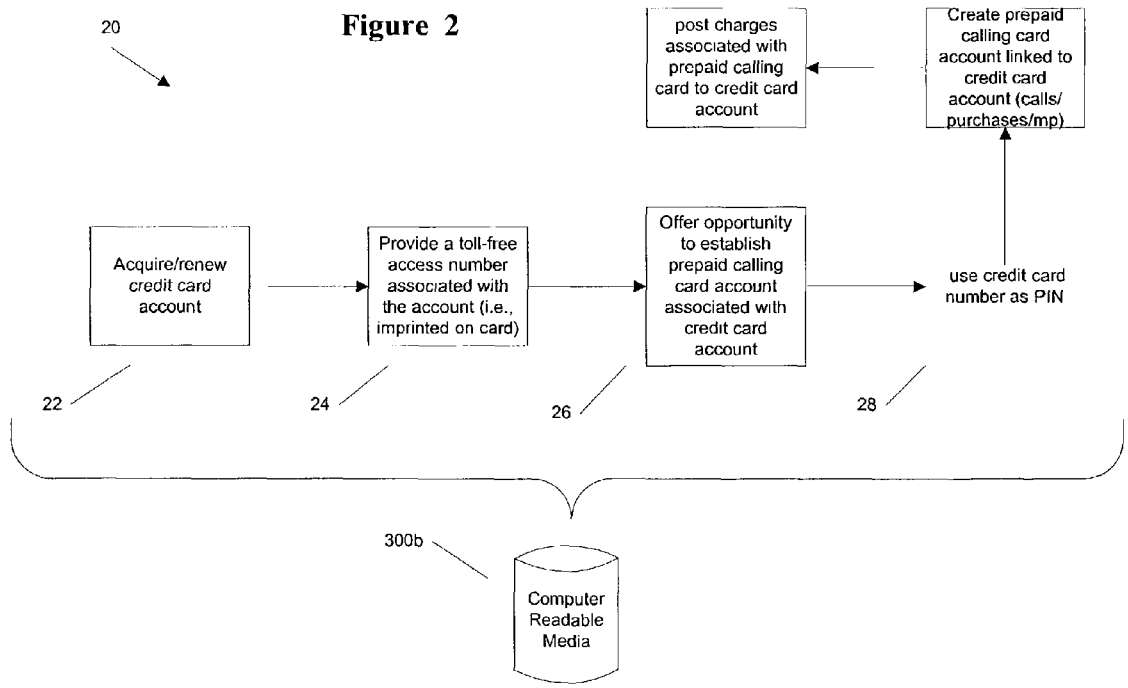

PREPAID CALLING CARD ACCOUNTS LINKED TO CREDIT CARD ACCOUNTS, WITH METHODS FOR CREATING AND MANAGING THE SAME

CROSS-REFERENCE TO RELATED APPLICATIONS

This application contains subject matter related to pending U.S. provisional patent application Ser. No. 60/305,830, entitled Prepaid Calling Card Accounts Linked to Credit Card Accounts, With Methods For Creating & Managing The Same, filed Jul. 16, 2001, claims the benefit of the filing date of such provisional application to the fullest extent permitted by 35 USC §119, and incorporates the text of such application herein in its entirely by this reference.

This application also contains subject matter related to the following pending U.S. non-provisional patent applications: Ser. No. 09/849,777, entitled System, Method and Business For Settling Micropayment Transactions to A Prepaid Instrument, filed May 4, 2001; and Ser. No. 10/195,303, entitled Systems, Methods, And Business Methods For Direct Settlement Of Purchase Transactions Conducted With Prepaid Instruments, filed Jul. 15, 2002.

BRIEF DESCRIPTIONS OF THE DRAWINGS

FIG. 1 is a flow chart illustrating processing flow performed by the invention as constructed according to a first embodiment.

FIG. 2 is a flow chart illustrating processing flow performed by the invention according to a second embodiment.

DETAILED DESCRIPTION OF ILLUSTRATIVE EMBODIMENTS

Overview of the Invention

The invention described herein provides prepaid calling card accounts linked to credit card accounts, with methods for creating and managing the same. By providing a prepaid calling card and credit card account linked in accordance with the invention, the invention enables consumers to consolidate credit card and prepaid calling card account usage tracking into one single account summary, thereby facilitating easier and more accurate recordkeeping and usage tracking. Such linked accounts also enable credit card issuers to offer additional value added services to their cardholders.

FIG. 1 is a flow chart 10 illustrating processing flow performed by the invention as constructed according to a first embodiment. At block 12, a consumer purchases goods and/or services, for example by interacting with a teleservices facility to which the facility's clients may outsource customer relationship management functions. As understood by those skilled in the art, a consumer's inbound call can be routed to an agent, enabling the agent and the consumer to interact to conclude the purchase. Alternatively, the agent could place an outbound call to the consumer with the purchasing proceeding as before. As a final alternative, the consumer could interact with an automated computer system either before or after interacting with a human agent.

As shown at block 14, during the course of the transaction, the consumer may provide a credit card number to pay for the goods and services being purchased. As shown at block 16, after the facility receives the credit card number, a prepaid calling card account is created, using the credit card number as a personal identification number (PIN) associated with the prepaid calling card account. A number for this account can be created, and the account can be activated, using methods known in the art. Activation here refers to the creation of a data structure corresponding to the prepaid calling card account, with the value associated with the account stored in the data structure.

As shown at block 18, once the prepaid calling card account has been created and activated, that account can be used as known in the art to pay for telephone calls, and also may be used to pay for consumer transactions, whether micropayment transactions or otherwise. For description of using prepaid calling card accounts to conduct micropayment transaction, please refer to the pending United States non-provisional patent applications referenced above.

FIG. 2 is a flow chart 20 illustrating processing flow performed by the invention according to a second embodiment. At block 22, a consumer acquires or renews a credit card account, for example, by interacting with a teleservices facility that is performing such operations on behalf of a credit card issuer. The interaction can be by an inbound or an outbound call, or by interaction with an interactive voice response unit. At block 24, the teleservices facility provides a toll-free access number associated with the newly acquired or renewed credit card account, which number the consumer dials to use the prepaid calling card. For example, this toll-free access number may be imprinted or otherwise embossed onto the plastic credit card.

At block 26, the consumer acquiring or renewing the credit card is offered the opportunity to establish a prepaid calling card account associated with the credit card account. If the consumer accepts this opportunity, processing may optionally proceed to block 28. At block 28, which is shown in dashed outline to indicate its status as an optional processing block, the consumer's credit card account number may be used as the PIN associated with the newly established prepaid calling card account, as described above in connection with FIG. 1. It is also within the scope of the invention to generate a PIN using conventional means and methods known in the art. In that case, processing would bypass block 28 and proceed directly from block 26 to block 30.

At block 30, the prepaid calling card account is created and is linked to the consumer's newly acquired or newly renewed credit card account. At this point, the prepaid calling card account can be used as known in the art for placing telephone calls, but can also be used for micropayment purchases, as taught in the 09/849,777 application or otherwise.

At block 32, any charges and information related to phone time or purchases that are associated with the prepaid calling card account are posted to the credit card account, whether those charges are in the form of telephone time or purchases of goods or services. It will be understood by those skilled in the art that the linkage or combination of the credit card account with the prepaid calling card account greatly simplifies the accounting and settlement process associated with the usage of these two accounts, and also allows the consumer to track both credit card usage, phone card usage for telecom calls, and phone card usage for purchases by referring to combined records associated with one account only.

To promote security and to avoid exposing the consumer to undue risk of loss from fraud should the credit card be misplaced or stolen, the method of the invention can enable the consumer to transfer value from the credit card account to the prepaid calling card in discrete quantities, for example, $100 increments or corresponding amounts of time. To perform this transfer, the consumer could be required to provide a second, secret PIN, such as the PIN associated with the credit card account that must be entered for cash withdrawals or the like. Thus, if the credit card is lost, a thief or other improper user can only access the phone time that is controlled by the PIN comprising the credit card number, and cannot access the entire credit card account via the secret PIN, assuming that the secret PIN is not otherwise compromised. In this manner, the consumer can regulate how much risk he or she is willing to face in transferring value from the credit card to the prepaid calling card.

Method of Operation

The invention provides methods of linking at least one prepaid calling card account to at least one credit card account existing at the time of linking the prepaid calling card account to the credit card account. According to various embodiments of the invention, the method comprises at least the following. At least one transaction is executed using the credit card account as payment for the transaction. At least one prepaid calling card account is then associated with the credit card account, and information related to the prepaid calling card account is provided to a holder of the credit card account.

According to various aspects of the method, the prepaid calling card account can be associated with the credit card account by using an account number of the credit card account as at least part of an account number for the prepaid calling card account. Further, the account number for the prepaid calling card account can also include an expiration date of the credit card account in whole or in part. Specifically, the account number for the prepaid calling card account can be defined by using only the credit card account number or only the credit card account expiration date, or by using concatenations of both the account number and expiration date, or by using other variations of both the account number and expiration date.

According to various further aspects of the method, the prepaid calling card account can be associated with the credit card account by using an account number of the credit card account as at least part of a Personal Identification Number (PIN) for the prepaid calling card account. Further, the PIN for the prepaid calling card account can also include an expiration date of the credit card account in whole or in part. Specifically, the PIN for the prepaid calling card account can be defined by using only the credit card account number or only the credit card account expiration date, or by using concatenations of both the account number and expiration date, or by using other variations of both the account number and expiration date.

As understood by those of ordinary skill in the art, a service bureau that supports processing of prepaid calling card accounts can use interactive voice response units (IVRs or VRUs) to interact with callers seeking to access value that they have stored on their calling cards. The callers are instructed to dial an access telephone number associated with the calling card, enter a card number and possibly a PIN, and finally dial a destination number to be dialed. As further understood by skilled artisans, the IVR/VRU accesses a data structure to support calling card calls. The data structure, inter alia, maps respective calling card numbers to corresponding PINs and remaining value parameters. The IVR/VRU then decrements value from the calling card as the call consumes time, until the caller hangs up.

To associate the prepaid calling card account with the credit card account, the data structure can be updated with a new calling card number, PIN, and remaining value parameter for the new prepaid calling card. The calling card number and PIN to be assigned to the new prepaid calling card account can be defined using any of the illustrative methods discussed above, and a new entry made in the data structure for the new prepaid calling card account. In this manner, the method can link the prepaid calling card account with the credit card account.

Once the data structure is updated with the above information to support the new prepaid calling card account, the method can provide information related to accessing the prepaid calling card account to the holder of the credit card and new calling card account. According to various embodiments of the invention, the method can include notifying a caller over a telecommunications network of the calling card account number and the PIN associated with the prepaid calling card account. The method can also include providing this information to the holder in physical form via conventional mail of the account number and the PIN associated with the prepaid calling card account, or providing this information to the holder in electronic form via a global communications network, such as the Internet. Once the holder receives this information, he/she can access call time stored on the new calling card the same as a conventional calling card, by dialing the access number, entering the account number/PIN, and dialing the destination number. However, the holder's credit card information may comprise part or all of the account number/PIN.

According to various embodiments of the invention, the method can include creating a new prepaid calling card account that has at least one predefined limit parameter applicable to a remaining value parameter associated with the calling card account. More specifically, the prepaid calling card account can have a predefined limit parameter that is quantified in terms of either monetary currency or duration of time. For example, the method may include selling the holder certain amounts of calling time per week/month, such as $50.00/month of calling time, or a given number of calling minutes per week/month. The fees for such sales may be charged to the credit card account to which the calling card account is linked, with calling card charges appearing on the holder's credit card statement the same as any other account transaction. An application program implementing the method can readily obtain the information for the credit card to which the calling card is linked from the IVR/VRU data structure discussed above.

The method can also include offering a holder of the prepaid calling card account incentives, such as retail store coupons, rebates, or the like, in exchange for unused portions of the stored value associated with the prepaid calling card account. For example, if the holder is not likely to exhaust the stored value within the time limit established for the account, then the method can offer to exchange the unused stored value for some alternative value to incentivize the holder to purchase other goods/services with the alternative value. This offer may be made through contact initiated by either the holder or by another party, such as a call center handling customer relationship management tasks for the entity processing the credit card account or the prepaid calling card account. To identify potential goods/services to offer the holder during this contact, the call center might employ technology as described in issued U.S. Pat. No. 6,055,513, and Ser. No. 09/038,399, entitled Methods And Apparatus For Intelligent Selection Of Goods And Services In Telephonic And Electronic Commerce, filed Mar. 11, 1998, Ser. No. 09/505,619, entitled Methods And Apparatus For Intelligent Selection Of Goods And Services In Telephonic And Electronic Commerce, filed Feb. 16, 2000, Ser. No. 09/691,392, entitled Methods And Apparatus For Intelligent Selection Of Goods And Services In Telephonic And Electronic Commerce, filed Oct. 17, 2000, Ser. No. 09/907,724, entitled Methods And Apparatus For Intelligent Selection Of Goods And Services In Telephonic And Electronic Commerce, filed Jul. 17, 2001 each of which are incorporated herein in their entirety by this reference.

According to another illustrative embodiment of the invention, the method may also be used to link a prepaid calling card account to a credit card account when the latter is activated, acquired, and renewed at the time of linking, in addition to the transaction-driven embodiment described above. The actions taken to implement this embodiment are substantially the same as those discussed above.

The invention also provides methods for locating at least one person who may be seeking access to a misappropriated or stolen credit card account. This aspect of the method can provide an anti-fraud capability, and can include at least the following. The credit card account is linked to a prepaid calling card account using any of the methods described above. The linking of the credit card account can be performed either before or after the credit card account is misappropriated. If the person uses, or attempts to use, the prepaid calling card account linked to the misappropriated credit card account to place a telephone call, then the method obtains index information related to this telephone call. The method can include obtaining Automatic Number Identification (ANI, or Caller ID) data associated with the telephone call, using well-known technology, and using the ANI data as index information to obtain the originating location from which the person placed the telephone call.

The method can further include mapping the ANI data associated with the telephone call to a corresponding location from which the telephone call originated. For example, databases commercially available from TARGUS Information Corporation (www.targusinfo.com) may assist in this mapping function, by mapping an input ANI to a corresponding address or physical location associated with that ANI. Given this originating location, the misappropriated credit card may be recovered and the person using the card apprehended.

Computer-Readable Medium/Media

As those skilled in the art will understand, a program of instructions can be loaded and stored onto a program storage media or devices 300*a* and 300*b* (see FIGS. 1 and 2) readable by a computer or other machine, embodying a program of instructions executable by the machine to perform the various aspects of the method as discussed and claimed herein, and as illustrated in the Figures. Generally speaking, the program storage media 300*a* and 300*b* can be implemented using any technology based upon materials having specific magnetic, optical, semiconductor or other properties that render them suitable for storing computer data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device 300*a* and 300*b* can be affixed permanently or removably to a bay, socket, connector, or other hardware provided by the cabinet, motherboard, or other component of a given computer system.

Those skilled in the art will also understand that a computer programmed in accordance with the above teaching using known programming languages provides means for realizing the various functions, methods, and processes as described and claimed herein and as illustrated in the drawing figures attached hereto.

Conclusion

The above description and the drawing figures associated with this description describe illustrative aspects of the invention, and are not intended to limit the invention. Instead, those skilled in the art will recognize that the concepts described and illustrated above may be extended, varied, or modified without departing from the scope of the invention, which is defined by the claims appended below.

We claim:

1. A method of linking, by a computer, at least one prepaid calling card account to a credit card account existing at the time of linking the at least one prepaid calling card account to the credit card account, the method comprising at least the following:

executing, by the computer, at least one transaction using the credit card account as payment for the transaction, wherein the executing comprises inputting a credit card number associated with the credit card account into at least one data structure having at least a processor and a memory;

associating, by the computer, the at least one prepaid calling card account with the credit card account, wherein the associating consolidates the credit card account and the at least one prepaid calling card account usage tracking into one single account summary;

updating, by the computer, the at least one data structure based on at least one of remaining value parameters of the at least one prepaid calling card account, changes in a prepaid calling card account number, and changes in a PIN number, and wherein the updating further comprises updating the data structure to include a new entry for the calling card account number so the data structure includes the calling card account number and the credit card number;

linking, by the computer, the at least one prepaid calling card account to the credit card account within the at least one data structure to provide information related to the updating to a holder of the at least one prepaid calling card account and the credit card account; and providing information and services, by the computer via a telecommunications network, related to the at least one prepaid calling card account to a holder of the credit card account; and transferring, by the holder of credit card account, value from the credit card account to the prepaid calling card account in increments and withdrawing the value in cash from the prepaid calling card.

2. The method of claim 1, wherein associating the at least one prepaid calling card account includes using an account number of the credit card account as at least part of an account number for the at least one prepaid calling card account.

3. The method of claim 1, wherein associating the at least one prepaid calling card account includes using at least an expiration date of the credit card account as at least part of an account number for the prepaid calling card.

4. The method claim 1, wherein associating the at least one prepaid calling card account includes using at least an account number of the credit card account as at least part of a Personal Identification Number (PIN) of the at least one prepaid calling card account.

5. The method of claim 1, wherein associating the at least one prepaid calling card account includes using at least an expiration date of the credit card account as at least part of a Personal Identification Number (PIN) of the at least one prepaid calling card account.

6. The method of claim 1, wherein associating the at least one prepaid calling card account includes updating the at least one data structure used to support the at least one prepaid calling card account with at least one of an account number of the credit card account and an expiration date of the credit card account.

7. The method of claim 1, wherein providing information related to the at least one prepaid calling card account to the holder includes notifying a caller over a telecommunications network of at least one of the account number and the PIN associated with the at least one prepaid calling card account.

8. The method of claim 1, wherein providing information related to the at least one prepaid calling card account to the holder includes notifying the prepaid calling card account holder via mail of the account number and the PIN associated with the at least one prepaid calling card account in addition to notifying the prepaid calling card account holder via a telecommunications network.

9. The method of claim 1, wherein providing information related to the at least one prepaid calling card account to the holder includes notifying the at least one prepaid calling card account holder via a global communications network of the account number and PIN of the at least one prepaid calling card account.

10. The method of claim 1, wherein creating the at least one prepaid calling card account includes creating the at least one prepaid calling card account having at least one predefined limit parameter applicable to a value associated with the at least one prepaid calling card account.

11. The method of claim 10, wherein creating the at least one prepaid calling card account includes creating the at least one prepaid calling card account having a predefined limit parameter that is specified based on a value of monetary currency.

12. The method of claim 10, wherein creating the at least one prepaid calling card account includes creating the at least one prepaid calling card account having a limit defined based on elapsed telephone network access time for which the at least one prepaid calling card account is used.

13. The method of claim 12, further comprising offering a holder of the prepaid calling card account at least one incentive in exchange for unused portions of the limit associated with the at least one prepaid calling card account.

14. The method of claim 13, wherein offering the holder of the at least one prepaid calling card includes offering the holder of the at least one prepaid calling card at least one coupon in exchange for an unused portion of the limit associated with the at least one prepaid calling card account.

15. A non-transitory computer program storage device readable by a computer, tangibly embodying a program of instructions executable by the computer to perform linking at least one prepaid calling card account to a credit card account existing at the time of linking the at least one prepaid calling card account to the credit card account, the method comprising at least the following:

executing at least one transaction using the credit card account as payment for the transaction, wherein the executing comprises inputting a credit card number associated with the credit card account into at least one data structure having at least a processor and a memory;

associating the at least one prepaid calling card account with the credit card account, wherein the associating consolidates the credit card account and the at least one prepaid calling card account usage tracking into one single account summary;

updating the at least one data structure based on at least one of remaining value parameters of the at least one prepaid calling card account, changes in a prepaid calling card account number, and changes in a PIN number, and wherein the updating further comprises updating the data structure to include a new entry for the calling card account number so the data structure includes the calling card account number and the credit card number;

linking the at least one prepaid calling card account to the credit card account within the at least one data structure to provide information related to the updating to a holder of the at least one prepaid calling card account and the credit card account;

providing information and services, via a telecommunications network, related to the at least one prepaid calling card account to a holder of the credit card account; and transferring, by the holder of credit card account, value from the credit card account to the at least one prepaid calling card account in increments and withdrawing the value in cash from the prepaid calling card.

\* \* \* \* \*